US008443193B1

(12) United States Patent
Dreymann et al.

(10) Patent No.: US 8,443,193 B1
(45) Date of Patent: May 14, 2013

(54) STATE-MAINTAINED MULTI-PARTY SIGNATURES

(75) Inventors: Daniel T. Dreymann, Palo Alto, CA (US); Stephan Brunner, Lafayette, CA (US); Yoel Gluck, San Francisco, CA (US); Anh Vo, Sunnyvale, CA (US)

(73) Assignee: Barracuda Networks, Inc., Campbell, CA (US)

( * ) Notice: Subject to any disclaimer, the term of this patent is extended or adjusted under 35 U.S.C. 154(b) by 265 days.

(21) Appl. No.: 12/859,738

(22) Filed: Aug. 19, 2010

Related U.S. Application Data

(60) Provisional application No. 61/235,124, filed on Aug. 19, 2009.

(51) Int. Cl.
*H04L 9/32* (2006.01)
(52) U.S. Cl.
USPC ........... 713/168; 713/155; 713/156; 713/157; 713/158; 713/159; 380/229; 705/67
(58) Field of Classification Search .......... 713/155–159, 713/168; 380/229; 705/67
See application file for complete search history.

(56) References Cited

U.S. PATENT DOCUMENTS

2006/0277597 A1 12/2006 Dreymann
2008/0244009 A1* 10/2008 Rand et al. .................... 709/206
2011/0040974 A1* 2/2011 Kaplan ......................... 713/176

OTHER PUBLICATIONS

Allman, et al., "DomainKeys Identified Mail (DKIM) Signatures," RFC 4871, Network Working Group, May 2007 [retrieved online Aug. 18, 2010].

* cited by examiner

*Primary Examiner* — Edan Orgad
*Assistant Examiner* — Roderick Tolentino
(74) *Attorney, Agent, or Firm* — Patentry

(57) ABSTRACT

A hash module of a mail sender creates a hash data context structure. The hash module processes the headers and the body of an e-mail message in the order required, for example by the DKIM specification, until the data to be hashed has been input. The hash module converts the context structure into printable characters and the encoded structure is transmitted over the Internet or other network to the next participating system. The token authority's hash module decodes the context back into binary form. After ensuring business logic is satisfied, it generates additional headers required for signature, which are then added to the developing hash. The hash module finalizes the hash function and creates the hash value. The authorization module creates the signature and returns it to the e-mail module, which attaches the signature to the message and transmits it to the destination mailbox provider, which verifies the token.

4 Claims, 3 Drawing Sheets

STATE-MAINTAINED MULTI-PARTY SIGNATURES

CROSS-REFERENCE TO RELATED APPLICATIONS

This application claims the benefit of U.S. Provisional Application 61/235,124, filed on Aug. 19, 2009, and which is incorporated by reference herein in its entirety.

BACKGROUND

1. Field of the Invention

The present invention relates generally to generating an authentication signature for an electronic mail message. In particular, the present invention enables multiple parties to sequentially create a single hash value from a message not known in its entirety by any party. The hash value may then be used to authenticate an e-mail message.

2. Description of Background Art

E-mail authentication and certification services are often used to ensure the reliable delivery of e-mail and confirm the identity of the sender. One service offered by Goodmail Systems, Inc., of Mountain View Calif., includes an imprinter associated with the mail sender, which hashes the body and certain fields of an e-mail message, and a generator, associated with a token authority, which performs an additional hash using the hash from the imprinter and a hash based on additional fields in the message header to create a token. The token and e-mail message are then sent to the recipient's ISP, where the token is validated and the message delivered. This arrangement protects the privacy of the message sender, because the original body and certain fields of the e-mail message, such as the addressee and subject, are never provided to the token authority.

Another e-mail authentication service is DomainKeys Identified Mail (DKIM). An organization can apply a DKIM signature to an e-mail message, and the signature can be verified by the receiver, thus ensuring that the e-mail received is from the domain associated with the signature and that the message was not altered en route. A DKIM signature is generated by hashing various header fields and the body of the e-mail message in an order dictated by the DKIM standard.

SUMMARY OF THE INVENTION

The present invention enables use of DKIM signatures, even when no single entity knows the contents of the all of the fields of the e-mail message being signed. More generally, the present invention enables multiple parties to sequentially process a message to produce a single digital signature.

A hash module of a mail sender creates a hash data context structure, which holds the internal state of the in-process hash. In one embodiment, the structure includes a 64-byte long internal buffer, five integers that hold the current state, an internal counter and a Boolean flag that indicates the current byte ordering based on the architecture of the system executing the hash function. The hash module processes the headers and the body of the message in the order required, for example by the DKIM specification, until all of the data to be hashed by the sender hash module has been input. The hash context then contains the current context of the algorithm after the last portion of the message known by the mail sender has been input.

The sender hash module then converts the context structure into printable characters, for example using Base64 or hex encoding, and the encoded structure is transmitted over the Internet or other network to the next participating system, e.g., a token authority, using HTTP or any other network connection.

The token authority's hash module decodes the context back into its binary form, and then has an exact copy of the original state of the hash context. After ensuring any required business logic is satisfied, it generates the additional headers required for signature, and these are then added to the developing hash.

Once all of the data has been added, the hash module finalizes the hash function and creates the hash value. The authorization module creates the DKIM signature and returns it to the e-mail module, which attaches the signature to the message and transmits the message to the destination mailbox provider. Upon arrival, the DKIM token is validated.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

E-mail authentication is routinely performed using methods such as DKIM (DomainKeys Identified Mail). As described in RFC 4871, DKIM allows "a person, role or organization that owns the signing domain to assert responsibility for a message, thus protecting message signer identity." Using DKIM, an organization signs an outbound e-mail, and the signature is validated by the receiver. The DKIM signature includes a hash of the e-mail's header and body. Signers must compute two hashes in a specific order. Because of the requirements of the DKIM specification, the signer must necessarily know the contents of the header fields in order to pass them to the hashing algorithm in the required order.

This causes a problem when using third-party signatures, in which a trusted third party such as a token authority applies its signature to an e-mail sent by a first party to the address of a second party. Typically, the sender of the e-mail message does not want to share information about the e-mail such as its contents, subject, or addressee, with the third party signer. Furthermore, the third-party signer does not need to know this information in order to determine whether to sign the message.

The present invention enables the use of a DKIM signature by a third-party signer without requiring access to all fields of the e-mailer header and body. More generally, the present invention enables multiple parties to sequentially generate a single hash value from a message, without requiring all parties to have access to the entire message.

Figure 1:
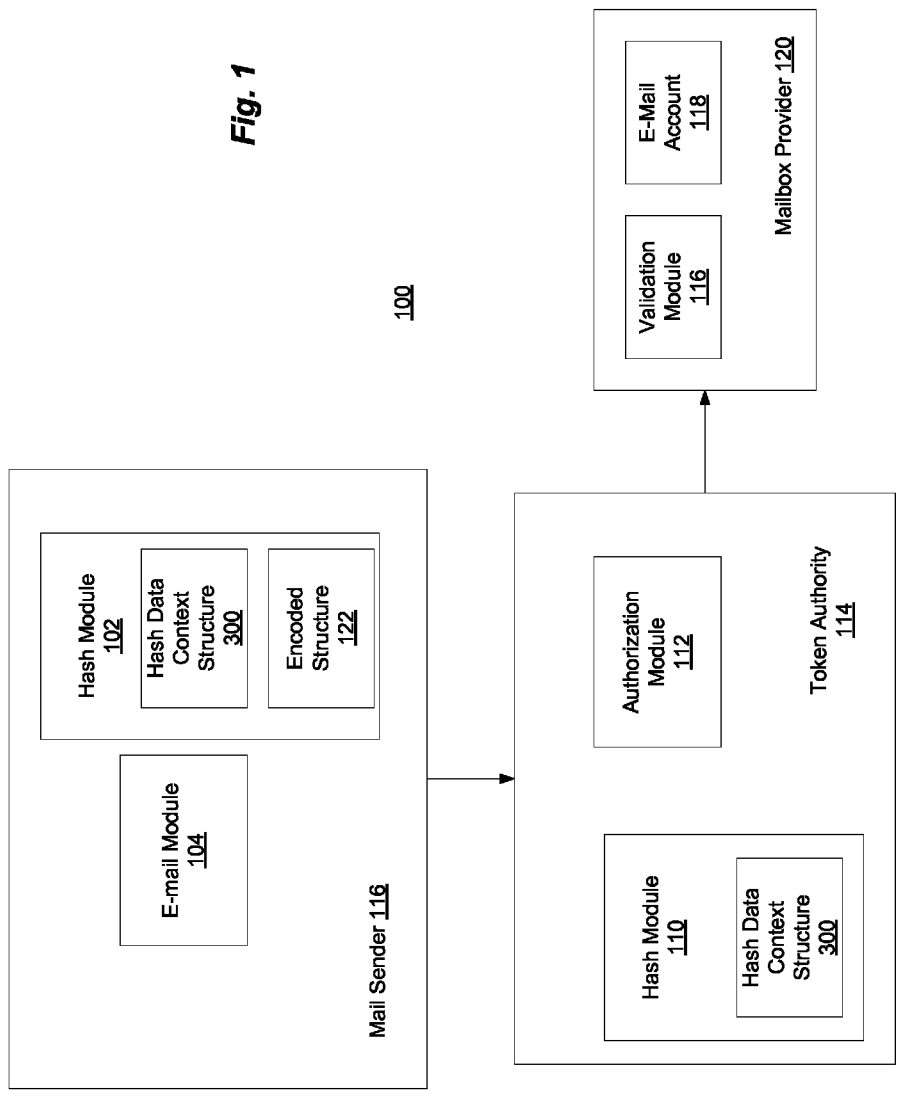
FIG. 1 is a block diagram of a system for distributed sequential hashing in accordance with an embodiment of the present invention.

FIG. 1 is a block diagram of a system 100 for distributed sequential hashing in accordance with an embodiment of the present invention. Although, as noted, the present invention has application beyond e-mail certification, we describe it here in that context, and no loss of generality should be inferred.

FIG. 1 includes a mail sender 116, token authority 114, and mailbox provider 120. Mail sender 116 includes an e-mail module 104 and a hash module 102. Hash module 102 further includes a hash data context structure 300. Token authority 114 also includes a hash module 110, having a hash data context structure 300, and an authorization module 112. Mailbox provider 120 includes a validation module 116 and e-mail account storage 118. In addition, many additional functions not germane to this discussion but known in the art may be performed by mail sender 116, token authority 114, and mailbox provider 120, and are not described or illustrated here in the interest of clarity.

We assume for purposes of description that the hashing algorithm being used is the Secure Hash Algorithm (SHA-1). In practice there are many hashing algorithms, and any may be suitably adapted to work with the described invention, as will be clear to those of skill in the art.

In the embodiment illustrated in FIG. 1, an e-mail message is sent from e-mail module 104 to an addressee with a mailbox 118 maintained by mailbox provider 120. The message is signed and certified by token authority 114, which receives the message from e-mail module 104, performs the certification, and sends the message to mailbox provider 120. Mailbox provider 120 validates the signature and delivers the message to the mailbox of the e-mail account 118.

An e-mail message includes a message body and a plurality of headers. The headers typically include information about who the message is from, whom it is addressed to, the subject of the message, and the date and time the message was created. Additional headers may be included to support various features offered by various mail transport agents, ISPs, and other vendors.

One method for certifying e-mail messages is described in U.S. Patent Application Publication 2006/0277597A1, incorporated by reference herein in its entirety. The aim of such a certification service is to alert the addressee's mailbox provider that the particular e-mail message in question is from who it claims to be from, and that it has not been tampered with in transit. The certification may also imply that the sender has agreed to follow certain business practices, such as removing the addressee from its mailing list upon request, not sending e-mails with certain types of content, etc. The certification is provided by way of a signed token that travels with the e-mail message, and which is validated by a token checker at the recipient's mailbox provider. In some implementations, a validated token means that the e-mail avoids the mailbox provider's spam filter. In other implementations, the validated token means that no or less investigation is required compared to e-mail without a token prior to delivery to the recipient's mailbox.

The token is generated and signed by a third-party token authority 114. In order to ensure that the e-mail is not tampered with en route to its destination, the token is generated in part from the contents of the message—thus, if the contents change, the token will no longer match the expected value generated by the token checker at the receiving end, and the tampering will be detected. Accordingly, to ensure that the source, destination, subject and body of the message are not altered, their contents must be inspected as part of generating the token.

Because the token is generated by the third party token authority 114, this would seem to implicate privacy concerns on the part of the e-mail sender, as the sender would have to supply a copy of the message to the token authority so that the authority could generate the token from its contents. To solve this privacy problem, in previous solutions the mail sender instead would hash the headers and body of the e-mail message, and send the hash values to the token authority, rather than the original text. The hash values would then be used, along with data supplied by the token authority, to create the token. Because a hash algorithm is a one-way function, the privacy of the contents could be maintained, and the integrity of the message could still be validated.

Some signature practices such as DKIM, described above, require the signature to be generated by hashing specified fields in a specified order. Using DKIM, an organization—in this case, token authority 114—signs an outbound e-mail using its private key. At the receiving end—in this case, mailbox provider 120, the signing organization's public key is used to validate the signature. The DKIM signature includes a hash of the e-mail's header and body. The DKIM specification requires signers to compute two hashes in a specific order. First, the signer is required to hash the message body and insert the hash into a header tag ("bh="). Then, the signer hashes the headers in an order specified by the contents of one of the tags, concluding with the (empty) header field for the signature.

Because of the requirements of the DKIM specification, it is assumed that the signer must necessarily know the contents of the body and header fields in order to pass them to the hashing algorithm in the required order.

A typical hashing algorithm takes an arbitrary-length message as input, and translates it into a fixed-length output. The input is divided into equal-sized blocks. Then, a one-way compression function is applied in sequence to the blocks, resulting in a shorter fixed-length output. Many algorithms including SHA-1 also combine a block of the input with the output of the previous round. The basic notion of hashing and many algorithms for performing a hash are well understood by those of skill in the art, and in addition to SHA-1, any suitable algorithm may be used.

Figure 2:
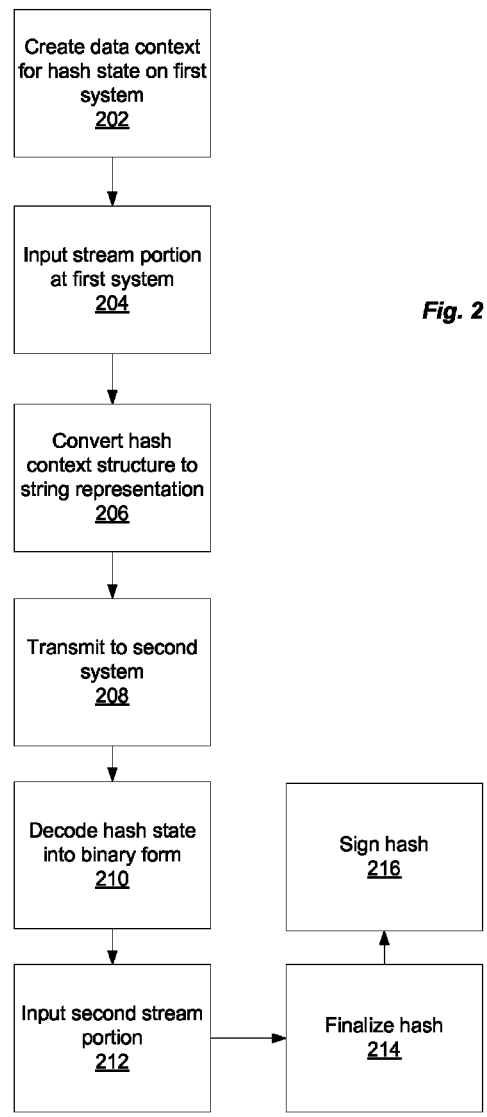
FIG. 2 illustrates a method for performing a hash using two computer systems in accordance with an embodiment of the present invention.
Figure 3:
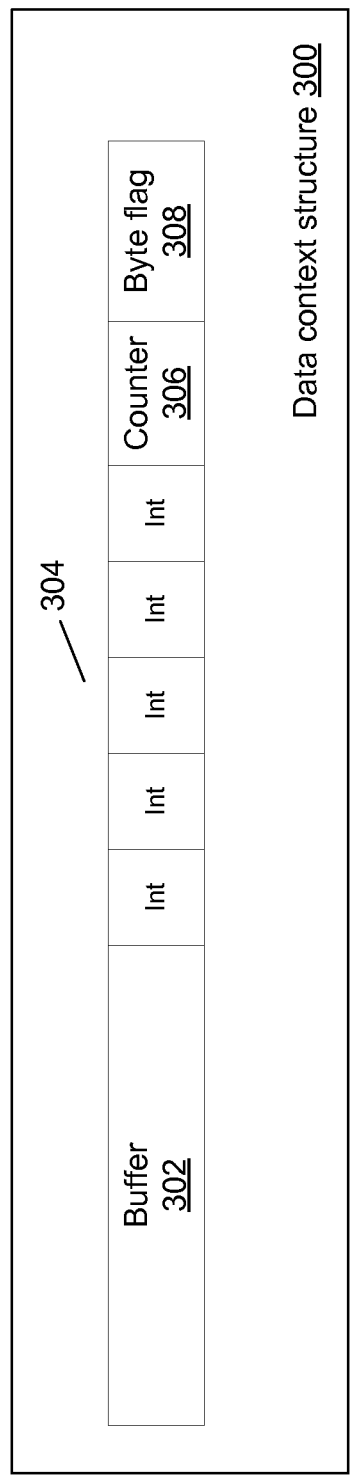
FIG. 3 illustrates a hash data context structure in accordance with an embodiment of the present invention.

Referring now to FIG. 1, FIG. 2 and FIG. 3 as appropriate, we describe the operation of an embodiment of the present invention. Initially, the contents of an e-mail to be sent by the sender to the recipient are created in a conventional manner, by an individual, a company, an e-mail service provider, or the like. E-mail module 104 provides an appropriate interface, for example a web interface, to the creator to allow the e-mail to be drafted. Alternatively, e-mail module 104 may incorporate a server such that the e-mail creator simply uploads the text of the e-mail once it has been drafted. In addition to the body of the message, e-mail module 114 adds message headers to the message, including, for example, the source address, destination address, and subject header fields. Additional fields may also be included as appropriate for the mail environment being used. Note that e-mail module 104 need not be a single module, and, depending on implementation, may reside on a client, server, or both.

Once the e-mail has been composed, e-mail module 104 provides the e-mail to hash module 102. Hash module 102 begins the process of hashing the header and body fields of the message as described below, and then transmits the in-process hash state to token authority 114.

Hash module 102 creates 202 (FIG. 2) a hash data context structure 300, an example of which is illustrated in FIG. 3 for a SHA-1 based implementation. Data context structure 300 holds the internal state of the in-process hash. Structure 300 in one embodiment includes a 64-byte long internal buffer 302, five integers 304 that hold the current state, an internal counter 306 as well as a Boolean flag 308 which indicates the current byte ordering based on the architecture of the system executing the hash function. This flag can be set to either little-endian or big-endian. All fields are stored in a consecutive chunk of memory.

Once hash module 102 has created context structure 300, hash module 102 begins the hashing function, inputting 204 to the function the headers and the body of the message in the order required, in this case by the DKIM specification.

The hashing algorithm proceeds until all of the data to be hashed by hash module 102 has been input. Note that at this point, a hash value has not been created by hash module 102—the hash value is not determined until all of the message to be hashed has been read in to the hash function, and a finalization step has been performed, as described below. Thus, at this point in the process, the hash context 300 contains the current context of the algorithm after the last portion of the message known by the mail sender 116 has been input.

Hash module 102 next takes the entire context structure 300, which is stored in consecutive memory, and converts it 206 from binary data into printable characters. In one embodiment, this is performed using Base64 encoding, or hex encoding. The hash context structure is now available in a string representation 122, and therefore can safely be transmitted 208 over the Internet or other network to the next participating system, e.g., token authority 114, using HTTP or any other network connection.

When token authority 114 receives the encoded context 122, hash module 110 decodes 210 the context 122 back into its binary form according to the original encoding algorithm used by hash module 102, and taking into account the endianness used for the encoding and identified by byte flag 308. Hash module 110 now has an exact copy of the original state of the hash context 300.

Authorization module 112 of token authority 114 proceeds with the business logic required to decide whether to provide a signature token to the e-mail message. For example, in various embodiments authorization module 112 determines whether mail sender 116 is in good standing with token authority 114, whether it has sufficient credits to pay for a token, whether the origination address (which in one embodiment is provided without or in addition to being hashed) is an address the sender 116 is authorized to use, and the like. If authorization module 112 determines that sender 116 has met the requirements for a token, it generates any additional headers required by its business logic or other certification rules, and these can then be added 212 to the developing SHA-1 hash by hash module 110. In one embodiment, business logic headers include indications of the type of token (e.g., marketing message, transactional message, video message, etc.), the sender's registered entity name, the sender's from address, the message subject as well as a globally unique message identifier, etc.

Once all of the data has been added, hash module 110 finalizes 214 the hash function and creates the hash value. Authorization module 112 then creates 216 the DKIM signature and returns it to e-mail module 104, which attaches the signature to the message and transmits the message to mailbox provider 110.

The e-mail then travels in a conventional method to a mailbox provider 120. Upon arrival, validation module 116 examines the DKIM token to determine whether it has a valid signature, signed by the token authority, and proceeds to process the (now trusted) other headers embodying the token.

If the token is not valid, the message may have been tampered with or otherwise compromised, and the e-mail is either rejected outright or treated by mailbox provider 120 as if it did not have a token to begin with. If the signature is valid, validation module 116 logs the successful receipt and validation of the token, and the e-mail message is delivered to the recipient's mailbox 118.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the e-mail module 104, hash module 102 and so forth may be provided in many or one module.

Some portions of the above description present the feature of the present invention in terms of algorithms and symbolic representations of operations on information. These algorithmic descriptions and representations are the means used by those skilled in the art of e-mail security to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for certifying an email message not known in its entirety by any one of multiple parties, the e-mail including a plurality of headers and a message body, the method comprising:

creating at a first computer operated by a mail sender, a data context for holding a state of an in-process hash, said data context comprising at least a 64-byte long internal buffer, five integers that hold the internal state, an internal counter, and a byte order endian flag; processing data including a plurality of the headers and the message body portion of the message known by the email sender according to a hash function;

storing in the data context in consecutive memory a state of the processed data portion of the message known by the email sender; creating a representation of the state of the processed data portion of the message known by the email sender, the representation including printable characters; and transmitting the representation of the state of the processed data portion over a network to a second computer operated by a mail signer.

2. The method of a claim 1 further comprising:

receiving, at the second computer operated by a mail signer, the transmitted representation of the state of the processed data portion;

decoding the received representation to obtain in consecutive memory the state of the processed data portion of the message known by the email sender;

generating a second plurality of headers; creating a hash value based on the hash function, the state of the processed data portion of the message known by the email sender, and the second plurality of headers; and associating a digital signature with the hash value.

3. A computer program product for certifying an email message not known in its entirety by any one of multiple parties, the e-mail including a plurality of headers and a message body, the computer program product stored on a non-transitory computer-readable medium and including code that, when executed by a first processor, causes a first computer to carry out steps comprising: creating at a first computer operated by a mail sender, a data context for holding a state of an in-process hash, said data context comprising at least a 64-byte long internal buffer, five integers that hold the internal state, an internal counter, and a byte order endian flag;

processing data including a plurality of the headers and the message body portion of the message known by the email sender according to a hash function;

storing in the data context in consecutive memory a state of the processed data portion of the message known by the email sender; creating a representation of the state of the processed data portion of the message known by the email sender, the representation including printable characters; and transmitting the representation of the state of the processed data portion over a network to a second computer operated by a mail signer.

4. The computer program product of a claim 3 further including code that, when executed by a second processor, causes a second computer to carry out steps comprising:

receiving, at the second computer operated by a mail signer, the transmitted representation;

decoding the received representation to obtain in consecutive memory the state of the processed data portion of the message known by the email sender;

generating a second plurality of headers;

creating a hash value based on the hash function, the state of the processed data portion of the message known by the email sender, and the second plurality of headers; and associating a digital signature with the hash value.

* * * * *